United States Patent
Miyashima et al.

(10) Patent No.: US 11,795,525 B2
(45) Date of Patent: *Oct. 24, 2023

(54) COPPER ALLOY PLATE, COPPER ALLOY PLATE WITH PLATING FILM, AND MANUFACTURING METHOD THEREOF

(71) Applicant: MITSUBISHI MATERIALS CORPORATION, Tokyo (JP)

(72) Inventors: Naoki Miyashima, Aizuwakamatsu (JP); Takanori Kobayashi, Aizuwakamatsu (JP); Kazunari Maki, Aizuwakamatsu (JP); Shinichi Funaki, Aizuwakamatsu (JP); Hiroyuki Mori, Kitamoto (JP); Yuki Ito, Kitamoto (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 87 days.

This patent is subject to a terminal disclaimer.

(21) Appl. No.: 17/438,954

(22) PCT Filed: Mar. 25, 2020

(86) PCT No.: PCT/JP2020/013416
§ 371 (c)(1),
(2) Date: Sep. 14, 2021

(87) PCT Pub. No.: WO2020/203576
PCT Pub. Date: Oct. 8, 2020

(65) Prior Publication Data
US 2022/0145424 A1    May 12, 2022

(30) Foreign Application Priority Data
Mar. 29, 2019  (JP) .................. 2019-065467

(51) Int. Cl.
*C22C 9/00* (2006.01)
*C25D 5/34* (2006.01)
(Continued)

(52) U.S. Cl.
CPC .............. *C22C 9/00* (2013.01); *B32B 15/018* (2013.01); *B32B 15/20* (2013.01); *C25D 5/34* (2013.01);
(Continued)

(58) Field of Classification Search
None
See application file for complete search history.

(56) References Cited

U.S. PATENT DOCUMENTS

| 5,667,752 A | 9/1997 | Suzuki et al. |
| 2011/0146855 A1 | 6/2011 | Sakurai et al. |

(Continued)

FOREIGN PATENT DOCUMENTS

| JP | H2-173248 A | 7/1990 |
| JP | H9-157774 A | 6/1997 |

(Continued)

OTHER PUBLICATIONS

Search Report issued in corresponding Taiwanese Patent Application No. TW 109110460, dated Aug. 4, 2023.

*Primary Examiner* — Seth Dumbris
(74) *Attorney, Agent, or Firm* — Locke Lord LLP; James E. Armstrong, IV; Nicholas J. DiCeglie, Jr.

(57) ABSTRACT

To improve adhesion between a plating film reducing contact electrical resistance and a copper alloy plate containing Mg. A copper alloy plate containing Mg of more than 1.2% by mass and 2% by mass or less and the balance Cu and inevitable impurities in a center portion in a plate thickness direction, in the copper alloy plate, a surface Mg concentration at a surface is 30% or less of a center Mg concen- (Continued)

tration at the center portion in the plate thickness direction, a surface layer portion having a depth from the surface to where a Mg concentration is 90% of the center Mg concentration is provided, and in the surface layer portion, the Mg concentration increases from the surface toward the center portion of the plate thickness direction with a concentration gradient of 0.2% by mass/μm or more and 50% by mass/μm or less.

13 Claims, 1 Drawing Sheet

(51) Int. Cl.
 B32B 15/01 (2006.01)
 B32B 15/20 (2006.01)
 C25D 5/50 (2006.01)
(52) U.S. Cl.
 CPC ......... *C25D 5/50* (2013.01); *Y10T 428/12903* (2015.01)

(56) References Cited

U.S. PATENT DOCUMENTS

| | | |
|---|---|---|
| 2014/0283961 A1 | 9/2014 | Maki et al. |
| 2016/0160321 A1 | 6/2016 | Ito et al. |
| 2018/0245183 A1 | 8/2018 | Maki et al. |
| 2022/0081738 A1* | 3/2022 | Miyashima ............... C25D 5/10 |
| 2023/0047984 A1* | 2/2023 | Akisaka .................. C23F 17/00 |

FOREIGN PATENT DOCUMENTS

| | | |
|---|---|---|
| JP | 4516154 B1 | 8/2010 |
| JP | 2010-248593 A | 11/2010 |
| JP | 2012-007231 A | 1/2012 |
| JP | 2013-095943 A | 5/2013 |
| JP | 2014-47378 A | 3/2014 |
| JP | 2015-45083 A | 3/2015 |
| JP | 2016-166397 A | 9/2016 |
| TW | 201522669 A | 6/2015 |
| WO | 2017/043558 A1 | 3/2017 |

\* cited by examiner

COPPER ALLOY PLATE, COPPER ALLOY PLATE WITH PLATING FILM, AND MANUFACTURING METHOD THEREOF

BACKGROUND OF THE INVENTION

Technical Field

The present invention relates to a copper alloy plate containing Mg (magnesium), a copper alloy plate with a plating film obtained by plating the copper alloy plate, and a manufacturing method thereof. Priority is claimed on Japanese Patent Application No. 2019-065467, filed on Mar. 29, 2019, the content of which is incorporated herein by reference.

Background Art

With the recent progress in miniaturization, thinning, and weight reduction of electronic devices such as mobile terminals, the terminals and connector parts used for these are also smaller and have a narrower electrode pitch. Further, in the use around the engine of an automobile, reliability under severe conditions at high temperature is also required. Consequently, for the necessity of maintaining the reliability of electrical connection of terminals and connector parts, further improvement of strength, electric conductivity, spring limit value, stress relaxation characteristics, bending workability, fatigue resistance and the like is required; and copper alloy plates containing Mg shown in Patent Documents 1 to 4 are used.

Patent Document 1 discloses a copper alloy thin plate for manufacturing a connector; the plate is composed of copper alloy having a composition containing Mg: 0.3 to 2% by weight, P: 0.001 to 0.02% by weight, C: 0.0002 to 0.0013% by weight, oxygen: 0.0002 to 0.001% by weight, and the balance Cu and inevitable impurities, and a structure in which oxide particles containing fine Mg having a particle size 3 μm or less are uniformly dispersed in a substrate.

Patent Document 2 discloses copper alloy and a manufacturing method thereof suitable for parts of electronic devices such as terminals, connectors, and relays. It is described that: this copper alloy contains Mg of 3.3 at % or more and 6.9 at % or less and the balance is substantially Cu and inevitable impurities; electric conductivity α (% IACS) is in a range of $\sigma \leq 1.7241/(-0.0347 \times X^2 + 0.6569 \times X + 1.7) \times 100$ when the concentration of Mg is X at %; the stress relaxation is 50% or less at 150° C. for 1000 hours; and in observation of a scanning electron microscope, an average number of intermetallic compound containing Cu and Mg having a particle size of 0.1 μm or more as an main ingredient is one/μm², so that it has low Young's modulus, high yield strength, high electric conductivity, excellent stress relaxation resistance and excellent bending workability.

Patent document 3 discloses copper alloy strip material of Cu—Mg—P based copper alloy having a composition of Mg: 0.3 to 2%, P: 0.001 to 0.1% in mass %, and the balance Cu and inevitable impurities and a manufacturing method thereof. It is described that: in the copper alloy, measuring the orientation of all pixels within a measurement area on a surface of the copper alloy strip material by the EBSD method using a scanning electron microscope equipped with a backscattered electron diffraction image system, when a boundary where an orientation difference between adjacent pixels is 5° or more is regarded as a crystal grain boundary, an area rate of crystal grains having an average orientation difference between all pixels in the crystal grain is less than 4° is 45 to 55% of the measured area, tensile strength is 641 to 708 N/mm², and a spring limit value is 472 to 503 N/mm²; and the tensile strength and the spring limit value are balanced at a high level.

Patent Document 4 discloses a copper alloy strip material having a composition of Mg: 0.3 to 2%, P: 0.001 to 0.1% in mass % and the balance Cu and inevitable impurities and a manufacturing method thereof. It is described that: in the copper alloy strip material, measuring the orientation of all pixels within a measurement area on a surface of the copper alloy strip material by the EBSD method using a scanning electron microscope equipped with a backscattered electron diffraction image system with a step size of 0.5 μm, when a boundary where an orientation difference between adjacent pixels is 5° or more is regarded as a crystal grain boundary, an area rate of crystal grains having an average orientation difference between all pixels in the crystal grain is less than 4° is 45 to 55% of the measured area, an area average GAM of crystal grains in the measured area is 2.2 to 3.0°, tensile strength is 641 to 708 N/mm², and a spring limit value is 472 to 503 N/mm²; and fatigue limit under completely reversed plane bending at $1 \times 10^6$ times is 300 to 350 N/mm².

The Applicant developed "MSP1" as Mg—P based copper alloy with excellent strength, electric conductivity, and stress relaxation resistance, and the like. "MSP1" is widely used as an automobile terminal, a movable relay piece, a contact spring material, a bus bar module, a lithium-ion battery, a fuse terminal, a small switch, a junction box, a relay box, a breaker, a battery terminal, and the like.

Further, with the aim of further reducing the friction coefficient (lowering the insertion force) of a copper alloy plate, an Sn-plated Cu—Mg—P based copper alloy plate disclosed in Patent Document 5 is also proposed. The Sn-plated Cu—Mg—P based copper alloy plate disclosed in Patent Document 5 has a copper alloy plate as a base material 2 having a composition containing 0.2 to 1.2% by mass of Mg and 0.001 to 0.2% by mass of P, and the balance is Cu and inevitable impurities, and has a plating film layer 5 after reflowing composed from a surface to the base material 2, in order of an Sn phase 6 having a thickness of 0.3 to 0.8 μm, an Sn—Cu alloy phase 7 having a thickness of 0.3 to 0.8 μm, and a Cu phase 8 having a thickness of 0 to 0.3 μm; a ratio (A/B) between a Mg concentration (A) of the Sn phase 6 and a Mg concentration (B) of the base material 2 is 0.005 to 0.05; and a ratio (C/B) between a Mg concentration (C) in a boundary surface layer 4 having a thickness of 0.2 to 0.6 μm between the plating film layer 5 and the base material 2 and the Mg concentration (B) of the base material 2 is 0.1 to 0.3.

CITATION LIST

[Patent Document 1] Japanese Unexamined Patent Application, First Publication No. H09-157774
[Patent Document 2] Japanese Unexamined Patent Application, First Publication No. 2013-095943
[Patent Document 3] Japanese Patent No. 4516154
[Patent Document 4] Japanese Unexamined Patent Application, First Publication No. 2012-007231
[Patent Document 5] Japanese Unexamined Patent Application, First Publication No. 2014-047378

SUMMARY OF INVENTION

Technical Problem

Copper alloy containing Mg has a balance between excellent mechanical strength and good electric conductivity owing to added Mg; however, further improvement of strength and weight reduction is required. The Applicant developed "MSP5" that realized this by increasing the amount of Mg; however, as the amount of Mg increases, the contact resistance on the surface of material increases, and the electrical connection reliability may deteriorate. Particularly when an Sn plating is performed on the base material and then heating and melting treatment is carried out in order to further improve the electrical connection reliability, the contact resistance of the plating film is remarkably increased in the end, and also adhesiveness between the plating film and the base material may deteriorate.

In Patent Document 5, by restricting the Mg concentration of the Sn phase on the surface of the plating film and the Mg concentration of the boundary surface layer between the plating film and the base material in a prescribed range in the Sn-plated copper alloy plate, the Sn-plated copper alloy plate having good characteristics is realized. However, this is a copper alloy plate having the Mg concentration in the range of 0.2 to 1.2% by mass; and further improvements are desired regarding the above-described problems when the Mg concentration exceeds 1.2% by mass.

The present invention is achieved in consideration of the above circumstances, and has an object to improve the contact electric resistance and the adhesiveness of the plating film in the copper alloy plate containing 1.2% by mass or more of Mg (magnesium).

Solution to Problem

In view of these circumstances, as a result of diligent research, the inventors has found that the increase of the contact electrical resistance is caused by the oxidation of Mg present on the surface of the base material, and in particular, the contact electrical resistance remarkably increases when the base material is subjected to Sn plating and then the heating and melting, because Mg is diffused by heating and reaches to the surface of the plating film. In this case, by alloying the base material of copper alloy with Sn, Mg is taken into the Sn—Cu alloy layer and the Sn layer, and the Mg is more easily diffused to the surface of the plating film.

Since Mg is an active element, Mg on the surface of the copper alloy plate before plating immediately becomes Mg oxide. When a copper alloy plate containing a large amount of Mg on the surface is plated, since Mg oxide on the surface of the base material and metal in the plating film are not able to form metallic bond the adhesiveness of the plating film is poor and peeling due to heating or the like is likely to occur.

Based on these findings, the present invention appropriately controls the Mg concentration on the surface layer portion of the copper alloy plate, so that oxidation of the surface is suppressed, and the Mg concentration in the plating film is reduced even when the plating film is formed, to intend reduction of the contact electrical resistance and improvement of the adhesiveness.

A copper alloy plate of the present invention is a copper alloy plate containing Mg of more than 1.2% by mass and 2% by mass or less and the balance Cu and inevitable impurities in a center portion in a plate thickness direction; in this copper alloy plate, a surface Mg concentration at a surface is 0% or more and 30% or less of a center Mg concentration at the center portion in the plate thickness direction, a surface layer portion having a depth from the surface to where a Mg concentration is 90% of the center Mg concentration is provided, and in the surface layer portion, the Mg concentration increases from the surface toward the center portion of the plate thickness direction with a concentration gradient of 0.2% by mass/μm or more and 50% by mass/μm or less.

Since the surface Mg concentration of this copper alloy plate is 305 or less of the center Mg concentration, Mg oxide is less likely to be generated on the surface, the electrical connection reliability is excellent, and the copper alloy plate can be used as a contact. Further, even when a plating film is formed later and heat-treated, it is possible to prevent Mg from diffusing into the plating film. Accordingly, the contact electrical resistance is excellent and the peeling of the plating film can be prevented.

In view of preventing oxidation of the surface and suppressing Mg diffusion into the plating film, the surface Mg concentration is preferably 30% or less of the center Mg concentration. Further, since the Mg concentration in the surface layer portion changes sharply as compared with the inside, the surface layer portion is thin and the excellent mechanical properties of copper alloy can be maintained.

If the concentration gradient of Mg in the surface layer portion is less than 0.2% by mass/μm from the surface, the above-described property of suppressing Mg diffusion is saturated, but the desired Mg concentration is not reached until a considerable depth, and the characteristics of the Mg-containing copper alloy plate is deteriorated. On the other, if the concentration gradient of Mg exceeds 50% by mass/μm, the surface layer portion having a low Mg concentration is too thin, and the effect of suppressing the diffusion of Mg is poor.

In one aspect of the copper alloy plate, a thickness of the surface layer portion is 0 μm or more and 9 μm or less. If the thickness of the surface layer portion exceeds 9 μm, proportion of the low Mg concentration range in a total plate thickness is large, and the mechanical characteristics as the Mg-containing copper alloy may be impaired. This deterioration of characteristics is remarkable especially when the plate thickness is thin.

One aspect of the copper alloy plate is to contain P of 0.001% by mass or more and 0.2% by mass or less.

The copper alloy plate with a plating film of the present invention is provided with the copper alloy plate and a plating film formed on the surface layer portion of the copper alloy plate.

In this copper alloy plate with a plating film, the surface Mg concentration of the copper alloy plate is low, so that the adhesiveness of the plating film is excellent. Further, Mg diffused from the copper alloy plate into the plating film can be reduced, and the contact electrical resistance is excellent.

In one aspect of the copper alloy plate with a plating film, an average concentration of Mg in the plating film is 10% or less of the center Mg concentration.

If the average concentration of Mg in the plating film exceeds 10% of the center Mg concentration of the copper alloy plate, the effect of the surface diffusion of Mg on the contact electrical resistance becomes large.

In another aspect of the copper alloy plate with a plating film, the plating film is formed of one or more layers selected from tin, copper, zinc, nickel, gold, silver, palladium and their respective alloys. By forming the plating film from these metals or alloys, it can be suitably used as a connector terminal.

In one aspect of the copper alloy plate with a plating film, a thickness of the surface layer portion is 9 μm or less.

In one aspect of the copper alloy plate with a plating film, the copper alloy plate contains 0.001% by mass or more and 0.2% by mass or less of P.

A manufacturing method of a copper alloy plate of the present invention includes an Mg enrichment treatment forming a surface portion where Mg is concentrated by diffusing Mg (magnesium) to the surface, and a surface portion removal treatment forming a surface layer portion by removing the surface portion.

In this manufacturing method, Mg in the Mg-containing copper alloy is first diffused and concentrated on the surface portion, and then the concentrated surface portion is removed. The surface layer portion formed after removing the surface portion has a low Mg concentration and less generation of an oxide film, and therefore has excellent contact electrical resistance.

In the manufacturing method of a copper alloy plate with a plating film of the present invention, the plating film is formed on the copper alloy plate by an electrolytic plating process at a current density of 0.1 A/dm$^2$ or more and 60 A/dm$^2$ or less. If the current density during the electrolytic plating is less than 0.1 A/dm$^2$, the film formation rate is slow and it is not economical. If the current density exceeds 60 A/dm$^2$, it exceeds diffusion limit current density, and a film cannot be formed without defects.

For example, when an electrolytic tin plating treatment is performed as the above-described electrolytic plating treatment, a reflow treatment may be performed in order to improve whisker resistance. That is, in one aspect of the manufacturing method of a copper alloy plate with a plating film, the plating film contains tin, and after the electrolytic plating treatment, a reflow treatment is performed at 230° C. or more and 330° C. or less of heating peak temperature, preferably 300° C. or less, for 0.5 seconds or more and 30 seconds or less of heating time at the heating peak temperature, preferably one second or more and 20 seconds or less.

If the peak heating temperature during processing is less than 230° C. or the heating time is less than 0.5 seconds, tin is not melted. If the heating temperature exceeds 330° C. or the heating time exceeds 30 seconds, the diffusion of Mg to the surface of the plating film proceeds due to overheating, the contact electrical resistance is increased.

Advantageous Effects of Invention

According to the present invention, oxidation on the surface is suppressed, the electrical connection reliability is improved, the Mg concentration in the plating film is reduced even when the plating film is formed, and it is possible to reduce the contact electrical resistance on the surface of the plating film and improve the adhesion between the plating film and the copper alloy plate.

DESCRIPTION OF EMBODIMENTS

Figure 1:
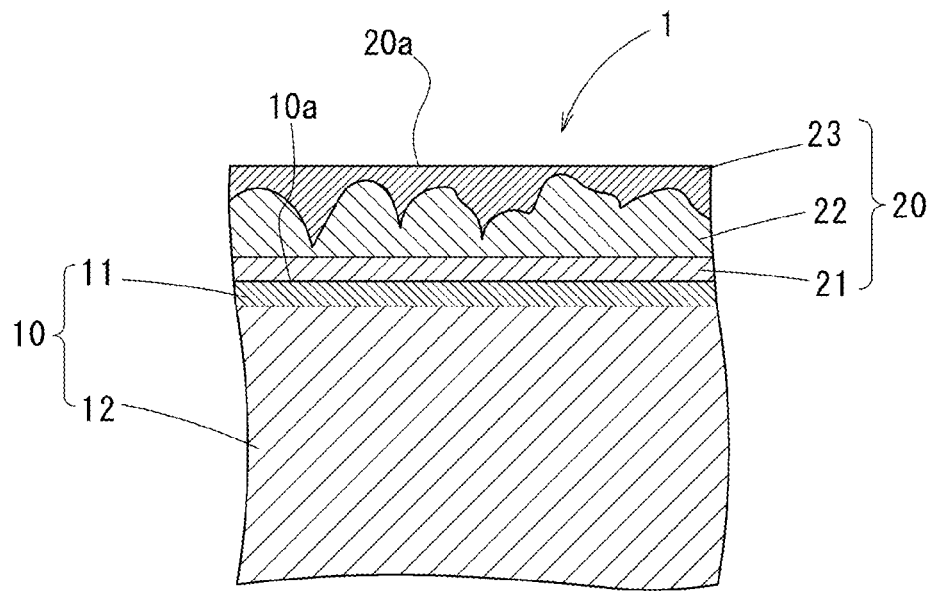
FIG. 1 It is a cross sectional view schematically showing one embodiment of a copper alloy plate with a plating film of the present invention.

An embodiment of the present invention will be explained. In a copper alloy plate 1 with a plating film of this embodiment, on a surface 10a of a copper alloy plate 10 containing Mg, a Cu layer 21, a Sn—Cu alloy layer 22, and a Sn layer 23 are laminated in this order to form a plating film 20.

[Copper Alloy Plate]

The copper alloy plate 10 contains in a center portion of a plate thickness direction more than 1.2% by mass and 2% by mass or less of Mg, and the balance is Cu and inevitable impurities.

(Mg)

Mg is dissolved in a base material of Cu to reduce a weight of the copper alloy plate 10 while improving strength. In this case, Mg concentration at the center portion of the plate thickness direction (center Mg concentration) is more than 1.2% by mass and 2% by mass or less; Further, a concentration gradient of Mg is generated from the surface 10a to the center portion of the plate thickness direction with 0.2% by mass/μm or more and 50% by mass/μm or less.

Since the copper alloy plate 39 has the surface Mg concentration of 30% or less of the center Mg concentration, oxidized Mg is hardly generated on the surface 10a, and also, even if it is plated and heated later, Mg can be suppressed from diffusing into the plating film 20. Accordingly, the contact electrical resistance is excellent and the peeling of the plating film 20 can be prevented.

In view of preventing oxidization of the surface 10a and suppressing diffusion of Mg into the plating film 20, it is sufficient that the surface 10a does not contain Mg (the surface Mg concentration is 0% of the center Mg concentration). However, if the surface Mg concentration is 30% or less of the center Mg concentration, it is preferable since the characteristics as Mg-containing copper alloy are imparted to some extent even on the surface 10a. More preferable surface Mg concentration is 20% or less of the center Mg concentration, more preferably, 15% or less.

If the concentration gradient of Mg from the surface 10 in the thickness direction is less than 0.2% by mass/μm, desired Mg concentration cannot be obtained up to the considerable depth, and the characteristics of a Mg-containing copper alloy plate is impaired. The concentration gradient of Mg is preferably 0.5% by mass or more, more preferably, 1.0% by mass/μm or more, and particularly preferably 1.8% by mass/μm or more.

On the other, if the concentration gradient of Mg exceeds 50% by mass/μm, the effect of suppressing diffusion of Mg is poor. The concentration gradient of Mg is preferably 30% by mass/μm or less, more preferably 17.5% by mass/μm or less.

A surface layer portion 11 is a range from the depth position where the Mg concentration is 90% of the center Mg concentration to the surface 10a in a portion where the Mg concentration gradient is generated. The surface layer portion 11 has a thickness of 0 μm or more and 9 μm or less, preferably 5 μm or less, more preferably 1 μm or less. With respect to the surface layer portion 11, an inner portion inside the surface layer portion 11 is defined as a base material inner portion 12.

Figure 2:
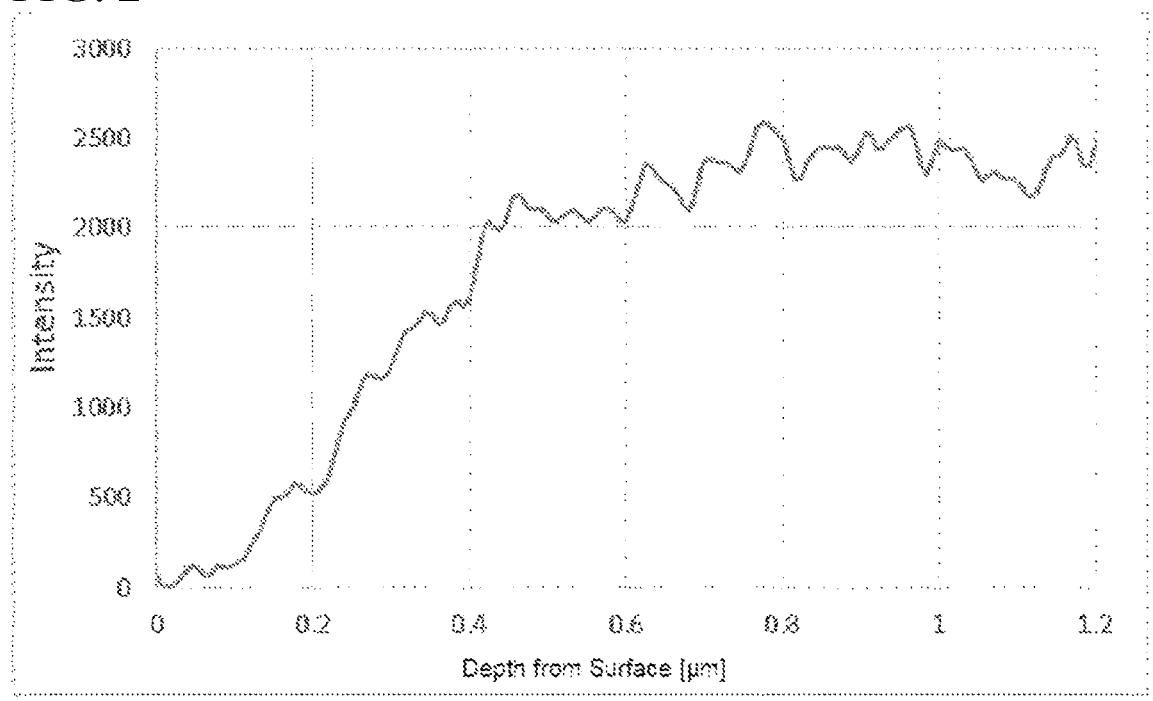
FIG. 2 It is an analysis figure of Mg component in a depth direction of a copper alloy plate measured by XPS.

FIG. 2 is a graph showing a result of analyzing the Mg component in the depth direction of a sample obtained by thinning the copper alloy plate 10 in the thickness direction with an X-ray photoelectron spectroscopy measurement device (XPS); and the horizontal axis is a depth from the surface, and the vertical axis is a spectral intensity of XPS. The Mg concentration measured at the center in the thickness direction of the base material is stable; an arithmetic mean of the maximum value and the minimum value was defined as the "center Mg concentration", and the depth (from the surface 10a) up to the first position where 90% of the center Mg concentration was reached was defined as the "surface layer thickness".

(Ingredients Other than Mg)

The copper alloy plate 10 may further contain, in addition to copper (Cu) and Mg, P (phosphorus) of 0.001% by mass or more and 0.2% by mass or less, C (carbon) of 0.0002 to 0.0013% by mass, and oxygen (O) of 0.0002 to 0.001% by mass.

P (phosphorus) has a dioxide effect during melt casting, and improves the strength of the copper alloy plate 10 in a state of coexisting with the Mg component.

C (carbon) is an element that is extremely difficult to enter into pure copper, but if it is contained in a small amount, it has an effect of suppressing oxide containing Mg from growing large. However, if the concentration of C is less than 0.0002% by mass, the effect is not sufficient. On the other hand, if the concentration of C exceeds 0.0013% by mass, C may precipitate at grain boundaries beyond the solid solution limit, causing grain boundary cracks and embrittlement, and cracks may occur during bending, it is not preferable. More preferable range is 0.0003 to 0.0010% by mass.

Oxygen (O) forms an oxide with Mg. If the oxide is fine and present in a small amount, it is effective in reducing wear of the punching die; but if the concentration of O is less than 0.0002% by mass, the effect is not sufficient. On the other hand, if it is contained more than 0.001% by mass, it is not preferable because the oxide containing Mg grows large. More preferable range is 0.0003 to 0.0008% by mass.

Further, the copper alloy plate 10 may contain Zu (zirconium) of 0.001 to 0.003% by mass. Zr (zirconium) contributes to the improvement of tensile strength and spring limit value by addition of 0.001 to 0.03% by mass. Outside the addition range, the effects of the tensile strength and the spring limit value cannot be expected.

[Plating Film]

The plating film 20 is structured from the Cu layer 21 having a thickness of 0 μm to 1 μm, the Sn—Cu alloy layer 22 having a thickness of 0.1 μm to 1.5 μm, and the Sn layer 23 having a thickness of 0.1 μm to 3.0 μm in order, from the surface 10a of the copper alloy plate 10 to the surface 20a of the plating film 20.

If the thickness of the Cu layer 21 exceeds 1 μm, thermal stress generated inside the plating film layer becomes high during heating, the plating film 20 may be peeled off. The Cu layer 21 may not exist.

The Sn—Cu alloy layer 22 is hard, but if the thickness is less than 0.1 μm, the effect of reducing the insertion force is diminished when used as a connector and the strength is reduced. If the thickness of the Sn—Cu alloy layer 22 exceeds 1.5 μm, the thermal stress generated in the plating film 20 becomes high during heating, and the plating film 20 may be peeled off.

If the thickness of the Sn layer 23 is less than 0.1 μm, the contact electrical resistance increases, and if it exceeds 3.0 μm, the thermal stress generated inside the plating film 20 may increase when heated.

The average concentration of Mg in the plating film 20 having the above layer structure is 10% or less (0% or more) of the center Mg concentration of the copper alloy plate 10.

If the average concentration of Mg in the plating film 20 exceeds 10% of the center Mg concentration of the copper alloy plate 10, Mg in the plating film may diffuse to the surface 20a to increase the contact electrical resistance. The average concentration of Mg in the plating film 20 is more preferably 5% or less of the center Mg concentration of the copper alloy plate 10, even more preferably, 3% or less.

[Manufacturing Method]

A method of manufacturing the copper alloy plate 1 with a plating film configured as described above will be explained.

This copper alloy plate 1 with a plating film is manufactured by producing a copper alloy base material having a composition including more than 1.2% by mass and 2% or less by mass of Mg and the balance of Cu and inevitable impurities (copper alloy base material producing step), performing a surface treatment on the obtained copper alloy base material (surface treatment process), and then performing a plating treatment (plating treatment step) and reflowing treatment (reflowing treatment process).

(Copper Alloy Base Material Production Process)

The copper alloy base material is manufactured by making material formulated in the above component range into an ingot of copper alloy by melting and casting, and the copper alloy ingot is subjected to the steps including hot rolling, cold rolling, continuous annealing, and finish cold rolling in this order. In this example, the plate thickness was 0.2 mm.

(Surface Treatment Process)

The obtained copper alloy base material is subjected to a surface treatment. This surface treatment has an Mg enrichment treatment in which Mg in the copper alloy base material is diffused to the surface portion and concentrated, and a surface portion removal treatment removing the surface portion where Mg is concentrated.

As the Mg enrichment treatment, the copper alloy base material is heated to predetermined temperature for predetermined time in an oxidizing atmosphere such as oxygen or ozone. In this case, the heating temperature, the heating time and the like are good at 100° C. or more and for a time during which recrystallization does not occur; and it can be performed at arbitrary temperature considering equipment restriction, economic efficiency, and the like. It may be a long time at a low temperature or a short time at a high temperature; for example, at 300° C. for one minute, 250° C. for two hours, or 200° C. for five hours.

Concentration of oxidizing substance in the oxidizing atmosphere may be, for example, 5 to 4000 ppm for ozone, preferably 10 to 2000 ppm, further preferably 20 to 1000 ppm. In a case in which ozone is not used but oxygen is used, it is desirable that the atmospheric concentration is twice or more that when only ozone is used. Oxidizing substance such as ozone may be mixed with oxygen and used. Before the Mg enrichment treatment, treatments for promoting the diffusion of Mg, such as mechanical polishing to introducing strain and pores, may be performed.

As the surface portion removal treatment, chemical polishing, electrolytic polishing, mechanical polishing, and the like are applied individually or in combination, to the copper alloy base material that was subjected to the Mg enrichment treatment.

Selective etching can be used for the chemical polishing. For the selective etching, etching using an acidic or alkaline solution containing component can be used which can suppress copper corrosion, such as a nonionic surfactant, a heterocyclic compound having a carbonyl group or a carboxyl group, an imidazole compound, a triazole compound, a tetrazole compound, or the like, for example.

For electrolytic polishing, for example, an acid or alkaline solution is used as the electrolytic solution, and etching preferential of the grain boundaries or the like can be used by electrolysis of components that easily segregate at the grain boundaries of copper.

For mechanical polishing, various methods can be used which are commonly used, such as a blasting treatment, a wrapping treatment, a polishing treatment, buffing, grinder polishing, and a sandpaper polishing.

As describe above, the copper alloy plate 10 is formed by subjecting the Mg enrichment treatment and the surface removal treatment to the copper alloy base material. In the copper alloy plate 10, as described above, the Mg concentration of the surface layer portion 11 is lower than the center Mg concentration, and the Mg concentration increases at the predetermined concentration gradient from the surface 10a toward the center portion of the plate thickness direction.
(Plating Treatment Process)

Next, a Cu-plating layer and a Sn-plating layer forming the plating film 20 are formed on the surface 10a of the copper alloy plate 10.

After the surface 10a is cleaned by performing degreasing, pickling and the like on the surface 10a of the copper alloy plate 10; then the Cu-plating layer is formed on that by performing a plating treatment of Cu or Cu alloy; and next, the Sn-plating layer is formed by performing a plating treatment of Sn or Sn alloy on a surface of the Cu-plating layer to form the Sn-plating layer.

In each plating treatment forming each plating layer, an electrolytic plating treatment is performed at current density of 0.1 A/dm$^2$ or more and 60 A/dm$^2$ or less. If the current density during the electrolytic plating treatment is less than 0.1 A/dm$^2$, the film formation rate is slow and uneconomical. If the current density exceeds 60 A/dm$^2$, it exceeds the diffusion limit current density, and a defect-free film cannot be formed.

Table 1 shows an example of conditions for Cu plating treatment or Cu alloy plating treatment, and Table 2 shows an example of conditions for Sn plating treatment or Sn alloy plating treatment.

TABLE 1

| Cu Plating Conditions | |
|---|---|
| Treatment Method | Electrolytic Plating |
| Plating Solution | Copper Sulfate Plating Solution |
| Soluton Temperature | 27° C. |
| Current Density | 4 A/dm$^2$ |

TABLE 2

| Sn Plating Conditions | |
|---|---|
| Treatment Method | Electrolytic Plating |
| Plating Solution | Tin Sulfate Plating Solution |
| Solution Temperature | 20° C. |
| Current Density | 2 A/dm$^2$ |

(Reflowing Treatment Process)

Next, on the copper alloy plate 10 on which the Cu-plating layer and the Sn-plating layer were formed, a reflowing treatment is performed by holding at heating peak temperature of 230° C. or more and 330° C. or less for 0.5 seconds or more and 30 seconds or less, and then cooling to temperature of 60° C. or less.

By performing this reflowing treatment, the plating film 20 formed in order from the Cu layer 21 having a thickness of 0 μm to 1 μm, the Sn—Cu alloy layer 22 having a thickness of 0.1 μm to 1.5 μm, and the Sn layer 23 having a thickness of 0.1 μm to 3.0 μm on the surface 10a of the copper alloy plate is formed to obtain the copper alloy plate 1 with a plating film. In this reflowing treatment, there is a case in which all Cu in the Cu-plating layer is alloyed with Sn in the Sn-plating layer and the Cu layer 21 is not formed.

Due to this reflowing treatment, there is a possibility that some Cu from the surface 10a of the copper alloy plate 10a is alloyed with Sn forming the plating film 20. However, regarding Mg, since the surface Mg concentration was made low, an amount of Mg taken from the copper alloy plate 10 into the plating film 20 is very small, and the surface diffusion of Mg can be effectively suppressed.

Further, the surface 10a of the copper alloy plate 10 has an extremely small amount of Mg, the surface oxide is also small, and even if a small amount of oxide is present, it can be easily removed by ordinary cleaning or the like before the plating treatment. Accordingly, the copper alloy plate 1 with a plating film has an excellent adhesion between the plating film 20 and the copper alloy plate 10. Further, since Mg oxide is hardly generated on the surface 10a, and the contact electrical resistance is also excellent.

In the above embodiment, the plating film 20 formed from in order of the Cu layer 21, the Sn—Cu alloy layer 22, and the Sn layer 23 was formed on the copper alloy plate 10; however, the plating film is not limited to this: it may be composed of one or more layers selected from tin, copper, zinc, nickel, gold, silver, palladium and their respective alloys.

Example 11

An ingot containing more than 1.2% by mass and 2% by mass or less (i.e., the center Mg concentration is more than 1.2% by mass and 2% by mass or less) and the balance of Cu and inevitable impurities was prepared, and performing hot rolling, intermediate annealing, cold rolling, and the like in a usual way to produce the copper alloy base material.

Next, by performing the Mg enrichment treatment by heating at the heating temperature of 200 to 300° C. and the heating time 1 minute to 5 hours in the oxidizing atmosphere, and then performing the surface portion removal treatment, the copper alloy plates having various Mg concentration gradients were produced.

The copper alloy plates were subjected to the surface portion removal treatment by physical polishing, chemical polishing, or electrolytic polishing. Physical polishing was buffing; chemical polishing was dipping in a polishing solution in which polyoxyethylene dodecyl ether was added to a mixed aqueous solution of sulfuric acid and hydrogen peroxide; and electrolytic polishing was energizing an aqueous phosphoric acid solution using SUS304 as a counter electrode.

As a Comparative Example, a copper alloy plate on which the Mg enrichment treatment and the surface portion removal treatment were not performed was also produced using a copper alloy base material having a Mg concentration of 1.3% by mass.

The surface Mg concentration and the Mg concentration in each part in the thickness direction of these copper alloy plates were measured.

The Mg concentration on the copper alloy plates in the thickness direction were measured from the concentration profile in the depth direction in X-ray photoelectron spectroscopy (XPS). The XPS measurement conditions are as follows.

(Measurement Condition)
  Pretreatment: Immersing in acetone solvent and pretreat at 38 kHz for 5 minutes using an ultrasonic cleaner.
  Equipment: ULVAC PHI X-ray photoelectron spectroscopy analyzer
    PHI5000 VersaProbe
  Sputtering rate: 100 Å/min
  Sputtering time: 100 minutes Since the depth in the above XPS is a conversion depth to $SiO_2$, the $SiO_2$ conversion depth in a concentration profile in XPS depth direction was converted into a real depth by comparing it with the other data measured by TEM-EDX from a sectional direction. The Mg concentration at the center portion in the thickness direction (center Mg concentration) was measured by sufficiently removing the surface layer portion region in which the Mg concentration increases from the surface, collecting a portion including the center portion from the region where the Mg concentration is stable, using a high-frequency inductively coupled plasma emission spectrometry (ICP-AES).

For each sample, the contact electrical resistance at the surface and surface hardness were measured.

With respect to the contact electrical resistance, a load change-contact electrical resistance were measured by a sliding type (1 mm) of 0 to 50 g using a four-terminal contact resistance test device (CRS-113-AU made by Yamasaki Seiki Laboratory) in accordance with JIS-C-5402 on test samples heated at 120° C. for 1000 hours, and it was evaluated by the contact electrical resistance value when the load was 50 g. The one having a contact electrical resistance value less than 2 mΩ was designated as "A", and the one having more than 2 mΩ was designated as "C".

With respect to the surface hardness, the hardness at loads of 0.5 gf and 10 gf was measured using a Vickers hardness tester, and if the hardness measured at the load of 0.5 gf (hardness near the surface) was 80% or more of the hardness measured at the load 10 gf (hardness at a side of the center portion in the thickness direction) it was designated as "A", or designated as "C" if it was less than 80%.

Tables 3A and 3B and Tables 4A and 4B show the evaluation results of the copper alloy plates. In each table, the "center Mg concentration" is a center Mg concentration at the center portion in the plate thickness direction; the "surface Mg concentration" is a surface Mg concentration on the surface of the copper alloy plate at a step when the surface removal treatment was performed; the "concentration ratio to center" is a ratio of the surface Mg concentration to the center Mg concentration; the "surface layer thickness" is a thickness from the surface of the copper alloy plate to where the Mg concentration first reaches 90% of the center concentration; and the "concentration gradient" is a gradient of the Mg concentration in the surface layer portion.

The surface layer thickness and the concentration gradient are calculated from the depth direction concentration profile of the Mg component by XPS. The concentration gradient means a gradient of a straight line between a concentration on the surface of the copper alloy plate and a point where it first reaches 90% of the plate thickness center portion concentration in the depth direction concentration profile of the Mg component by XPS. That is, in the depth direction concentration profile, in a case in which the change of the Mg concentration from the surface of the copper alloy plate to the point where it first reaches 90% of the plate thickness center portion concentration can be regarded as a straight line having substantially a constant gradient even if there are local fluctuations, its gradient is defined as the concentration gradient.

FIG. 2 is an example of the concentration profile which relates to a sample of Table 3B having the center Mg concentration of 1.6% by mass and the concentration gradient of 3.2% by mass/μm. Including this example, in each of samples in Tables 3A and 3B and Tables 4A and 4B, the surface Mg concentration was adjusted to be substantially 0%. Accordingly, the concentration ratio to center is zero in each case.

TABLE 3A

| Center Mg Concentration 1.3 (% by mass) | | | | | | |
|---|---|---|---|---|---|---|
| Concentration Gradient (% by mass/μm) | Removal Method | Surface Mg Concentration (% by mass) | Concentration Ratio to Center (%) | Surface Layer Thickness (μm) | Contact Electrical Resistance | Surface Hardness |
| 0.2 | Physical Polishing | 0 | 0 | 5.85 | A | A |
| | Chemical Polishing | 0 | 0 | | A | A |
| | Electrolytic Polishing | 0 | 0 | | A | A |
| 0.5 | Physical Polishing | 0 | 0 | 2.34 | A | A |
| | Chemical Polishing | 0 | 0 | | A | A |
| | Electrolytic Polishing | 0 | 0 | | A | A |
| 1.0 | Physical Polishing | 0 | 0 | 1.17 | A | A |
| | Chemical Polishing | 0 | 0 | | A | A |
| | Electrolytic Polishing | 0 | 0 | | A | A |
| 1.8 | Physical Polishing | 0 | 0 | 0.65 | A | A |
| | Chemical Polishing | 0 | 0 | | A | A |
| | Electrolytic Polishing | 0 | 0 | | A | A |
| 3.2 | Physical Polishing | 0 | 0 | 0.37 | A | A |
| | Chemical Polishing | 0 | 0 | | A | A |
| | Electrolytic Polishing | 0 | 0 | | A | A |
| 17.5 | Physical Polishing | 0 | 0 | 0.07 | A | A |
| | Chemical Polishing | 0 | 0 | | A | A |
| | Electrolytic Polishinc | 0 | 0 | | A | A |
| 30 | Physical Polishing | 0 | 0 | 0.04 | A | A |
| | Chemical Polishing | 0 | 0 | | A | A |
| | Electrolytic Polishing | 0 | 0 | | A | A |
| 50 | Physical Polishing | 0 | 0 | 0.02 | A | A |
| | Chemical Polishing | 0 | 0 | | A | A |
| | Electrolytic Polishing | 0 | 0 | | A | A |

TABLE 3B

| | | Center Mg Concentration 1.6 (% by mass) | | | | |
|---|---|---|---|---|---|---|
| Concentration Gradient (% by mass/μm) | Removal Method | Surface Mg Concentration (% by mass) | Concentration Ratio to Center (%) | Surface Layer Thickness (μm) | Contact Electrical Resistance | Surface Hardness |
| 0.2 | Physical Polishing | 0 | 0 | 7.20 | A | A |
| | Chemical Polishing | 0 | 0 | | A | A |
| | Electrolytic Polishing | 0 | 0 | | A | A |
| 0.5 | Physical Polishing | 0 | 0 | 2.88 | A | A |
| | Chemical Polishing | 0 | 0 | | A | A |
| | Electrolytic Polishing | 0 | 0 | | A | A |
| 1.0 | Physical Polishing | 0 | 0 | 1.44 | A | A |
| | Chemical Polishing | 0 | 0 | | A | A |
| | Electrolytic Polishing | 0 | 0 | | A | A |
| 1.8 | Physical Polishing | 0 | 0 | 0.80 | A | A |
| | Chemical Polishing | 0 | 0 | | A | A |
| | Electrolytic Polishing | 0 | 0 | | A | A |
| 3.2 | Physical Polishing | 0 | 0 | 0.45 | A | A |
| | Chemical Polishing | 0 | 0 | | A | A |
| | Electrolytic Polishing | 0 | 0 | | A | A |
| 17.5 | Physical Polishing | 0 | 0 | 0.08 | A | A |
| | Chemical Polishing | 0 | 0 | | A | A |
| | Electrolytic Polishing | 0 | 0 | | A | A |
| 30 | Physical Polishing | 0 | 0 | 0.05 | A | A |
| | Chemical Polishing | 0 | 0 | | A | A |
| | Electrolytic Polishing | 0 | 0 | | A | A |
| 50 | Physical Polishing | 0 | 0 | 0.03 | A | A |
| | Chemical Polishing | 0 | 0 | | A | A |
| | Electrolytic Polishing | 0 | 0 | | A | A |

TABLE 4A

| | | Center Mg Concentration 2 (% by mass) | | | | |
|---|---|---|---|---|---|---|
| Concentration Gradient (% by mass/μm) | Removal Method | Surface Mg Concentration (% by mass) | Concentration Ratio to Center (%) | Surface Layer Thickness (μm) | Contact Electrical Resistance | Surface Hardness |
| 0.2 | Physical Polishing | 0 | 0 | 9.00 | A | A |
| | Chemical Polishing | 0 | 0 | | A | A |
| | Electrolytic Polishing | 0 | 0 | | A | A |
| 0.5 | Physical Polishing | 0 | 0 | 3.60 | A | A |
| | Chemical Polishing | 0 | 0 | | A | A |
| | Electrolytic Polishing | 0 | 0 | | A | A |
| 1.0 | Physical Polishing | 0 | 0 | 1.80 | A | A |
| | Chemical Polishing | 0 | 0 | | A | A |
| | Electrolytic Polishing | 0 | 0 | | A | A |
| 1.8 | Physical Polishing | 0 | 0 | 1.00 | A | A |
| | Chemical Polishing | 0 | 0 | | A | A |
| | Electrolytic Polishing | 0 | 0 | | A | A |
| 3.2 | Physical Polishing | 0 | 0 | 0.56 | A | A |
| | Chemical Polishing | 0 | 0 | | A | A |
| | Electrolytic Polishing | 0 | 0 | | A | A |
| 17.5 | Physical Polishing | 0 | 0 | 0.10 | A | A |
| | Chemical Polishing | 0 | 0 | | A | A |
| | Electrolytic Poiishing | 0 | 0 | | A | A |
| 30 | Physical Polishing | 0 | 0 | 0.06 | B | A |
| | Chemical Polishing | 0 | 0 | | B | A |
| | Electrolytic Polishing | 0 | 0 | | B | A |
| 50 | Physical Polishing | 0 | 0 | 0.04 | B | A |
| | Chemical Polishing | 0 | 0 | | B | A |
| | Electrolytic Polishing | 0 | 0 | | B | A |

TABLE 4B

Center Mg Concentration 1.3 (% by mass)

| Concentration Gradient (% by mass/μm) | Removal Method | Surface Mg Concentration (% by mass) | Concentration Ratio to Center (%) | Surface Layer Thickness (μm) | Contact Electrical Resistance | Surface Hardness |
|---|---|---|---|---|---|---|
| ∞ (unprocessed) | — | 1.3 | 100 | — | C | A |
| 0.1 | Physical Polishing | 0 | 0 | 11.7 | A | C |
|  | Chemical Polishing |  |  |  | A | C |
|  | Electrolytic Polishing |  |  |  | A | C |
| 95 | Physical Polishing | 0 | 0 | 0.01 | C | A |
|  | Chemical Polishing |  |  |  | C | A |
|  | Electrolytic Polishing |  |  |  | C | A |

As shown in Tables 3A and 3B and Tables 4A and 4B, the copper alloy plates on which the Mg enrichment treatment and the surface portion removal treatment were not performed and the copper alloy plates having more than 50% by mass/μm of the Mg concentration gradient were high in the contact electrical resistance. Regarding the surface hardness, in the material having the center Mg concentration of 1.3% by mass, the surface hardness was significantly deteriorated in the one having less than 0.2% by mass/μm of the Mg concentration gradient.

Example 2

Next, after performing degreasing, pickling and the like on each copper alloy plate of Example 1, the Cu plating treatment was performed under the Cu-plating conditions shown in Table 1 to form the Cu-plating layer, then the Sn plating treatment was performed under the Sn plating conditions shown in Table 2 to form the Sn-plating layer, and the copper alloy plates on which these plating layer were formed was subjected to the reflowing treatment to manufacture the copper alloy plate with a plating film.

In the reflowing treatment, the plating layer was heated to temperature of 230° C. or higher and 330° C. or lower, then cooled to temperature of 60° C. or lower.

Then, a sample was cut out from this copper alloy plate with a plating film, and the surface Mg concentration, the contact electrical resistance on the surface, and the adhesion of the plating film were measured. The measuring method of the contact electrical resistance is the same as in Example 1.

The measurement of the Mg concentration was calculated from the concentration profile of the depth direction from the surface of the plating film by XPS as in the case of the copper alloy plate of Example 1.

With respect to the contact electrical resistance, a load change-contact electrical resistance were measured by a sliding type (1 mm) of 0 to 50 g using a four-terminal contact resistance test device (CRS-113-AU made by Yamasaki Seiki Laboratory) in accordance with JIS-C-5402 on test samples heated at 120° C. for 1000 hours, and it was evaluated by the contact electrical resistance value when the load was 50 g. The one having a contact electrical resistance value less than 2 mΩ was designated as "A", and the one having more than 2 mf was designated as "C".

The adhesion was evaluated by the Cross-cut test on a sample heated at 120° C. for 1000 hours. Cuts were made on the sample with a cutter knife to form 100 grids of 1 mm square, then cellophane tape (#405 made by Nichiban Co., Ltd.) was pressed against the grids by finger pressure. After the cellophane tape was peeled off, it was rated as A when plating was not peeled off, B when the number of grids which were peeled off, or C when 7 or more grids were peeled off.

Tables 5A and 5B and Tables 6A and 6B show the evaluation results of the copper alloy plate with a plating film. In each table, the "center Mg concentration" is a center Mg concentration at the center portion in the plate thickness direction; the "surface Mg concentration" is a surface Mg concentration on the surface of the copper alloy plate at a step when the surface removal treatment was performed; the "concentration ratio to center" is a ratio of the surface Mg concentration to the center Mg concentration; the "surface layer thickness" is a thickness from the surface of the copper alloy plate to where the Mg concentration first reaches 90% of the center concentration; and the "concentration gradient" is a gradient of the Mg concentration in the surface layer portion. The surface layer thickness and the concentration gradient are calculated from the depth direction concentration profile of the Mg component by XPS.

In each sample of Tables 5A and 5B and Tables 6A and 6B, a plating film was formed on a copper alloy plate having various surface Mg concentrations. The concentration gradient means a gradient of a straight line between a concentration on the surface of the copper alloy plate and a point where it first reaches 90% of the plate thickness center portion concentration in the depth direction concentration profile of the Mg component by XPS. That is, in the depth direction concentration profile, in a case in which the change of the Mg concentration from the surface of the copper alloy plate to the point where it first reaches 90% of the plate thickness center portion concentration can be regarded as a straight line having substantially a constant gradient even if there are local fluctuations, its gradient is defined as the concentration gradient.

Note that examples in which the Cu plating treatment was not performed and only the Sn plating treatment was performed were designated as "0" for the Cu-plating layer thickness in Tables 5A, 5B, 6A, and 6B. The thickness of the Sn-plating layer of the respective samples of Tables 5A, 5B, 6A, and 6B was 1.0 μm.

TABLE 5A

Center Mg Concentration 1.3 (% by mass)

| Concentration Gradient (% by mass/μm) | Removal Method | Surface Mg Concentration (% by mass) | Concentration Ratio to Center (%) | Surface Layer Thickness (μm) | Cu-Plating Layer Thickness (μm) | Adhesion | Contact Electrical Resistance |
|---|---|---|---|---|---|---|---|
| 0.2 | Physical Polishing | 0.310 | 23.8 | 4.30 | 0 | A | A |
|  |  |  |  |  | 1.0 | A | A |
|  | Chemical Polishing | 0.340 | 26.2 | 4.15 | 0 | A | A |
|  |  |  |  |  | 1.0 | A | A |
|  | Electrolytic Polishing | 0.240 | 18.5 | 4.65 | 0 | A | A |
|  |  |  |  |  | 1.0 | A | A |
| 0.5 | Physical Polishing | 0.360 | 27.7 | 1.62 | 0 | A | A |
|  |  |  |  |  | 1.0 | A | A |
|  | Chemical Polishing | 0.250 | 19.2 | 1.84 | 0 | A | A |
|  |  |  |  |  | 1.0 | A | A |
|  | Electrolytic Polishing | 0.060 | 4.6 | 2.22 | 0 | A | A |
|  |  |  |  |  | 1.0 | A | A |
| 1.0 | Physical Polishing | 0.050 | 3.8 | 1.12 | 0 | A | A |
|  |  |  |  |  | 1.0 | A | A |
|  | Chemical Polishing | 0.330 | 25.4 | 0.84 | 0 | A | A |
|  |  |  |  |  | 1.0 | A | A |
|  | Electrolytic Polishing | 0.110 | 8.5 | 1.06 | 0 | A | A |
|  |  |  |  |  | 1.0 | A | A |
| 1.8 | Physical Polishing | 0.350 | 26.9 | 0.46 | 0 | A | A |
|  |  |  |  |  | 1.0 | A | A |
|  | Chemical Polishing | 0.240 | 18.5 | 0.52 | 0 | A | A |
|  |  |  |  |  | 1.0 | A | A |
|  | Electrolytic Polishing | 0.130 | 10.0 | 0.58 | 0 | A | A |
|  |  |  |  |  | 1.0 | A | A |
| 3.2 | Physical Polishing | 0.160 | 12.3 | 0.32 | 0 | A | A |
|  |  |  |  |  | 1.0 | A | A |
|  | Chemical Polishing | 0.020 | 1.5 | 0.36 | 0 | A | A |
|  |  |  |  |  | 1.0 | A | A |
|  | Electrolytic Polishing | 0.060 | 4.6 | 0.35 | 0 | A | A |
|  |  |  |  |  | 1.0 | A | A |
| 17.5 | Physical Polishing | 0.100 | 7.7 | 0.06 | 0 | A | A |
|  |  |  |  |  | 1.0 | A | A |
|  | Chemical Polishing | 0.100 | 7.7 | 0.06 | 0 | A | A |
|  |  |  |  |  | 1.0 | A | A |
|  | Electrolytic Polishing | 0.080 | 6.2 | 0.06 | 0 | A | A |
|  |  |  |  |  | 1.0 | A | A |
| 30 | Physical Polishing | 0.120 | 9.2 | 0.04 | 0 | A | A |
|  |  |  |  |  | 1.0 | A | A |
|  | Chemical Polishing | 0.200 | 15.4 | 0.03 | 0 | A | A |
|  |  |  |  |  | 1.0 | A | A |
|  | Electrolytic Polishing | 0.020 | 1.5 | 0.04 | 0 | A | A |
|  |  |  |  |  | 1.0 | A | A |
| 50 | Physical Polishing | 0.020 | 1.5 | 0.02 | 0 | A | A |
|  |  |  |  |  | 1.0 | A | A |
|  | Chemical Polishing | 0.100 | 7.7 | 0.02 | 0 | A | A |
|  |  |  |  |  | 1.0 | A | A |
|  | Electrolytic Polishing | 0.070 | 5.4 | 0.02 | 0 | A | A |
|  |  |  |  |  | 1.0 | A | A |

TABLE 5B

Center Mg Concentration 1.6 (% by mass)

| Concentration Gradient (% by mass/μm) | Removal Method | Surface Mg Concentration (% by mass) | Concentration Ratio to Center (%) | Surface Layer Thickness (μm) | Cu-Plating Layer Thickness (μm) | Adhesion | Contact Electrical Resistance |
|---|---|---|---|---|---|---|---|
| 0.2 | Physical Polishing | 0.100 | 6.3 | 6.70 | 0 | A | A |
|  |  |  |  |  | 1.0 | A | A |
|  | Chemical Polishing | 0.350 | 21.9 | 5.45 | 0 | A | A |
|  |  |  |  |  | 1.0 | A | A |
|  | Electrolytic Polishing | 0.010 | 0.6 | 7.15 | 0 | A | A |
|  |  |  |  |  | 1.0 | A | A |
| 0.5 | Physical Polishing | 0.040 | 2.5 | 2.80 | 0 | A | A |
|  |  |  |  |  | 1.0 | A | A |
|  | Chemical Polishing | 0.020 | 1.3 | 2.84 | 0 | A | A |
|  |  |  |  |  | 1.0 | A | A |
|  | Electrolytic Polishing | 0.000 | 0.0 | 2.88 | 0 | A | A |
|  |  |  |  |  | 1.0 | A | A |

TABLE 5B-continued

| | | Center Mg Concentration 1.6 (% by mass) | | | | | |
|---|---|---|---|---|---|---|---|
| Concentration Gradient (% by mass/μm) | Removal Method | Surface Mg Concentration (% by mass) | Concentration Ratio to Center (%) | Surface Layer Thickness (μm) | Cu-Plating Layer Thickness (μm) | Adhesion | Contact Electrical Resistance |
| 1 | Physical Polishing | 0.290 | 18.1 | 1.15 | 0 | A | A |
| | | | | | 1.0 | A | A |
| | Chemical Polishing | 0.040 | 2.5 | 1.40 | 0 | A | A |
| | | | | | 1.0 | A | A |
| | Electrolytic Polishing | 0.050 | 3.1 | 1.39 | 0 | A | A |
| | | | | | 1.0 | A | A |
| 1.8 | Physical Polishing | 0.100 | 6.3 | 0.74 | 0 | A | A |
| | | | | | 1.0 | A | A |
| | Chemical Polishing | 0.250 | 15.6 | 0.66 | 0 | A | A |
| | | | | | 1.0 | A | A |
| | Electrolytic Polishing | 0.150 | 9.4 | 0.72 | 0 | A | A |
| | | | | | 1.0 | A | A |
| 3.2 | Physical Polishing | 0.300 | 18.8 | 0.36 | 0 | A | A |
| | | | | | 1.0 | A | A |
| | Chemical Polishing | 0.170 | 10.6 | 0.40 | 0 | A | A |
| | | | | | 1.0 | A | A |
| | Electrolytic Polishing | 0.200 | 12.5 | 0.39 | 0 | A | A |
| | | | | | 1.0 | A | A |
| 17.5 | Physical Polishing | 0.060 | 3.8 | 0.08 | 0 | A | A |
| | | | | | 1.0 | A | A |
| | Chemical Polishing | 0.360 | 22.5 | 0.06 | 0 | A | A |
| | | | | | 1.0 | A | A |
| | Electrolytic Polishing | 0.350 | 21.9 | 0.06 | 0 | A | A |
| | | | | | 1.0 | A | A |
| 30 | Physical Polishing | 0.340 | 21.3 | 0.04 | 0 | A | A |
| | | | | | 1.0 | A | A |
| | Chemical Polishing | 0.060 | 3.8 | 0.05 | 0 | A | A |
| | | | | | 1.0 | A | A |
| | Electrolytic Polishing | 0.220 | 13.8 | 0.04 | 0 | A | A |
| | | | | | 1.0 | A | A |
| 50 | Physical Polishing | 0.040 | 2.5 | 0.03 | 0 | A | A |
| | | | | | 1.0 | A | A |
| | Chemical Polishing | 0.230 | 14.4 | 0.02 | 0 | A | A |
| | | | | | 1.0 | A | A |
| | Electrolytic Polishing | 0.250 | 15.6 | 0.02 | 0 | A | A |
| | | | | | 1.0 | A | A |

TABLE 6A

| | | Center Mg Concentration 2 (% by mass) | | | | | |
|---|---|---|---|---|---|---|---|
| Concentration Gradient (% by mass/μm) | Removal Method | Surface Mg Concentration (% by mass) | Concentration Ratio to Center (%) | Surface Layer Thickness (μm) | Cu-Plating Layer Thickness (μm) | Adhesion | Contact Electrical Resistance |
| 0.2 | Physical Polishing | 0.030 | 1.5 | 8.85 | 0 | A | A |
| | | | | | 1.0 | A | A |
| | Chemical Polishing | 0.040 | 2.0 | 8.80 | 0 | A | A |
| | | | | | 1.0 | A | A |
| | Electrolytic Polishing | 0.350 | 17.5 | 7.25 | 0 | A | A |
| | | | | | 1.0 | A | A |
| 0.5 | Physical Polishing | 0.240 | 12.0 | 3.12 | 0 | A | A |
| | | | | | 1.0 | A | A |
| | Chemical Polishing | 0.200 | 10.0 | 3.20 | 0 | A | A |
| | | | | | 1.0 | A | A |
| | Electrolytic Polishing | 0.280 | 14.0 | 3.04 | 0 | A | A |
| | | | | | 1.0 | A | A |
| 1.0 | Physical Polishing | 0.150 | 7.5 | 1.65 | 0 | A | A |
| | | | | | 1.0 | A | A |
| | Chemical Polishing | 0.230 | 11.5 | 1.57 | 0 | A | A |
| | | | | | 1.0 | A | A |
| | Electrolytic Polishing | 0.070 | 3.5 | 1.73 | 0 | A | A |
| | | | | | 1.0 | A | A |
| 1.8 | Physical Polishing | 0.310 | 15.5 | 0.83 | 0 | A | A |
| | | | | | 1.0 | A | A |
| | Chemical Polishing | 0.220 | 11.0 | 0.88 | 0 | A | A |
| | | | | | 1.0 | A | A |
| | Electrolytic Polishing | 0.050 | 2.5 | 0.97 | 0 | A | A |
| | | | | | 1.0 | A | A |

TABLE 6A-continued

Center Mg Concentration 2 (% by mass)

| Concentration Gradient (% by mass/μm) | Removal Method | Surface Mg Concentration (% by mass) | Concentration Ratio to Center (%) | Surface Layer Thickness (μm) | Cu-Plating Layer Thickness (μm) | Adhesion | Contact Electrical Resistance |
|---|---|---|---|---|---|---|---|
| 3.2 | Physical Polishing | 0.320 | 16.0 | 0.46 | 0 | A | A |
|  |  |  |  |  | 1.0 | A | A |
|  | Chemical Polishing | 0.040 | 2.0 | 0.55 | 0 | A | A |
|  |  |  |  |  | 1.0 | A | A |
|  | Electrolytic Polishing | 0.170 | 8.5 | 0.51 | 0 | A | A |
|  |  |  |  |  | 1.0 | A | A |
| 17.5 | Physical Polishing | 0.060 | 3.0 | 0.10 | 0 | A | A |
|  |  |  |  |  | 1.0 | A | A |
|  | Chemical Polishing | 0.130 | 6.5 | 0.10 | 0 | A | A |
|  |  |  |  |  | 1.0 | A | A |
|  | Electrolytic Polishing | 0.110 | 5.5 | 0.10 | 0 | A | A |
|  |  |  |  |  | 1.0 | A | A |
| 30 | Physical Polishing | 0.080 | 4.0 | 0.06 | 0 | B | A |
|  |  |  |  |  | 1.0 | A | A |
|  | Chemical Polishing | 0.310 | 15.5 | 0.05 | 0 | B | A |
|  |  |  |  |  | 1.0 | A | A |
|  | Electrolytic Polishing | 0.240 | 12.0 | 0.05 | 0 | B | A |
|  |  |  |  |  | 1.0 | A | A |
| 50 | Physical Polishing | 0.210 | 10.5 | 0.03 | 0 | B | A |
|  |  |  |  |  | 1.0 | A | A |
|  | Chemical Polishing | 0.090 | 4.5 | 0.03 | 0 | B | A |
|  |  |  |  |  | 1.0 | A | A |
|  | Electrolytic Polishing | 0.340 | 17.0 | 0.03 | 0 | B | A |
|  |  |  |  |  | 1.0 | A | A |

TABLE 6B

Center Mg Concentration 1.3 (% by mass)

| Concentration Gradient (% by mass/μm) | Removal Method | Surface Mg Concentration (% by mass) | Concentration Ratio to Center (%) | Surface Layer Thickness (μm) | Cu-Plating Layer Thickness (μm) | Adhesion | Contact Electrical Resistance |
|---|---|---|---|---|---|---|---|
| ∞ (unprocessed) | — | 1.300 | 100.0 | — | 0 | C | C |
|  |  |  |  |  | 1.0 | C | C |
| 95 | Physical Polishing | 0.200 | 15.4 | 0.01 | 0 | C | C |
|  |  |  |  |  | 1.0 | C | A |
|  | Chemical Polishing | 0.400 | 30.8 | 0.01 | 0 | C | C |
|  |  |  |  |  | 1.0 | C | C |
|  | Electrolytic Polishing | 0.050 | 3.8 | 0.01 | 0 | C | C |
|  |  |  |  |  | 1.0 | C | A |

As shown in Tables 5A and 5B and Tables 6A and 6B, the copper alloy plates on which the Mg enrichment treatment and the surface portion removal treatment were not performed (concentration gradient is ∞) or having the Mg concentration gradient of more than 50% by mass/μm were deteriorated in the adhesion of the plating film, and in many cases, the contact electrical resistance were also deteriorated (increased).

Example 3

A sample having a center Mg concentration of 1.3% by mass and a concentration gradient of 0.2% by mass/μm was prepared by the same methods as in Example 1. When preparing, by varying the amount of the surface portion removal in the surface portion removal treatment, the samples had the same concentration gradient but different surface Mg concentrations. The prepared samples were plated in the same manner as in Example 2 to prepare copper alloy plate with a plating film, and the plating adhesion and the contact electrical resistance of the copper alloy plate with a plating film was measured. The results are shown in Table 7.

TABLE 7

Center Mg Concentration 1.3 (% by mass)

| Concentration Gradient (% by mass/μm) | Surface Mg Concentration (% by mass) | Concentration Ratio to Center (%) | Cu-Plating Layer Thickness (μm) | Adhesion | Contact Electrical Resistance |
|---|---|---|---|---|---|
| 0.2 | 0 | 0.0 | 0 | A | A |
|  |  |  | 1.0 | A | A |
|  | 0.13 | 10.0 | 0 | A | A |
|  |  |  | 1.0 | A | A |
|  | 0.23 | 17.7 | 0 | A | A |
|  |  |  | 1.0 | A | A |
|  | 0.32 | 24.6 | 0 | A | A |
|  |  |  | 1.0 | A | A |
|  | 0.41 | 31.5 | 0 | A | C |
|  |  |  | 1.0 | C | A |

TABLE 7-continued

Center Mg Concentration 1.3 (% by mass)

| Concentration Gradient (% by mass/μm) | Surface Mg Concentration (% by mass) | Concentration Ratio to Center (%) | Cu-Plating Layer Thickness (μm) | Adhesion | Contact Electrical Resistance |
|---|---|---|---|---|---|
| | 0.55 | 42.3 | 0 | A | C |
| | | | 1.0 | C | A |

As shown in Table 7, in the samples in which the surface Mg concentration exceeded 30% of the center Mg concentration, the plating adhesion and the contact electrical resistance were deteriorated.

Example 4

Material having various concentration gradients was prepared from material having the center Mg concentration of 2.0% by mass by the same manner in Example 1, then plating was performed by the same manner as in Example 2 to produce a copper alloy plate with a plating film. The Mg concentration in the plating film and the contact electrical resistance of the obtained copper alloy plate with a plating film were confirmed. The Mg concentration in the plating film was measured by XPS under the same conditions as in Example 1. The results are shown in Table 8. The "concentration ratio to center" in Table 8 indicates the ratio of the average Mg concentration in the plating film to the center Mg concentration.

TABLE 8

Center Mg Concentration 2 (% by mass)

| Cu-Plating Layer Thickness (μm) | Concentration Gradient (% by mass/μm) | Concentration Ratio to Center (%) | Contact Electrical Resistance |
|---|---|---|---|
| 1.0 | 0.2 | 0.0 | A |
| | 0.5 | 0.2 | A |
| | 1.0 | 0.3 | A |
| | 1.8 | 0.3 | A |
| | 3.2 | 1.0 | A |
| | 17.5 | 3.0 | A |
| | 30 | 5.4 | A |
| | 50 | 9.2 | A |
| | 64 | 11.4 | C |
| | 90 | 16.1 | C |

As shown in Table 8, in the samples in which the concentration gradient exceeded 50% by mass/μm, the concentration ratio to center (ratio of the average concentration of Mg in the plating film to the center Mg concentration) exceeded 10%, and also the contact electrical resistance was deteriorated.

Example 5

By the same manner as in Example 1, a copper alloy plate (bare material) having 1.8% by mass of the center Mg concentration of the copper alloy plate and various Mg concentration gradient in the surface layer portion and adjusted to have the surface Mg concentration adjusted to 0% by mass was prepared, and then only one layer of various metal plating layers shown in Table 9 was formed. In this Example, only the plating treatment was performed and the reflowing treatment was not performed.

The metal types of plating were Sn, Cu, Zn, Ni, Au, Ag, and Pd. The plating current densities were all 3 A/dm2, and the thickness of the plating film was 1 μm. As various plating baths, any of the generally used acidic, neutral, and alkaline baths may be used. In this example, the acidic bath was used for Cu, Zn, Ni, and Pd, and the alkaline bath was used for Au and Ag.

The contact electrical resistance and the adhesion of the plating film of the samples prepared by the above procedure were evaluated. The contact electrical resistance was evaluated using the material immediately after plating. The evaluation method and the determination method are the same in Examples 1 to 2. The evaluation results are shown in Table 9.

TABLE 9

Center Mg Concentration 1.8 (% by mass)

| Surface Layer Thickness (μm) | Concentration Gradient (% by mass/μm) | Removal Method | Plating Type | Adhesion | Contact Electrical Resistance |
|---|---|---|---|---|---|
| 8.10 | 0.2 | Physical Polishing | Sn | A | A |
| | | | Cu | A | A |
| | | | Zn | A | A |
| | | | Ni | A | A |
| | | | Au | A | A |
| | | | Ag | A | A |
| | | | Pd | A | A |
| 0.03 | 50 | Physical Polishing | Sn | A | A |
| | | | Cu | A | A |
| | | | Zn | A | A |
| | | | Ni | A | A |
| | | | Au | A | A |
| | | | Ag | A | A |
| | | | Pd | A | A |
| — | ∞ (unprocessed) | Physical Polishing | Sn | C | A |
| | | | Cu | C | A |
| | | | Zn | C | A |
| | | | Ni | C | A |
| | | | Au | C | A |
| | | | Ag | C | A |
| | | | Pd | C | A |
| 0.02 | 95 | Physical Polishing | Sn | C | A |
| | | | Cu | C | A |
| | | | Zn | C | A |
| | | | Ni | C | A |
| | | | Au | C | A |
| | | | Ag | C | A |
| | | | Pd | C | A |

As shown in Table 9, the contact electrical resistances were all good, but in the samples in which the Mg concentration gradient exceeded 50% by mass/μm, plating was peeled off after heating.

In this example, the plating was only one layer; however, it is not limited embodiments and various metals can be alloyed by treatment such as heating and the like for the purpose of cost reduction and further improvement of characteristics, or multiple plating layer structure can be performed.

INDUSTRIAL APPLICABILITY

Oxidation of a surface is suppressed, the electrical connection reliability is improved, the Mg concentration in the plating film is reduced even when the plating film is formed; and the contact electrical resistance on the surface of the plating film can be reduced, the adhesion between the plating film and the copper alloy plate can be improved.

REFERENCE SIGNS LIST

1 Copper alloy plate with plating film
10 Copper alloy plate
10a Surface (of copper alloy plate)
11 Surface layer portion
12 Inside of base material
20 Plating film
20a Surface (of plating film)
21 Cu layer
22 Sn—Cu alloy layer
23 Sn layer

The invention claimed is:

1. A copper alloy plate containing Mg of more than 1.2% by mass and 2% by mass or less and the balance Cu and inevitable impurities in a center portion in a plate thickness direction, wherein
a surface Mg concentration at a surface is 0% or more and 30% or less of a center Mg concentration at the center portion in the plate thickness direction,
a surface layer portion having a depth from the surface to where a Mg concentration is 90% of the center Mg concentration is provided, and
in the surface layer portion, the Mg concentration increases from the surface toward the center portion of the plate thickness direction with a concentration gradient of 0.2% by mass/μm or more and 50% by mass/μm or less.

2. The copper alloy plate according to claim 1 wherein a thickness of the surface layer portion is 0 μm or more and 9 μm or less.

3. The copper alloy plate according to claim 1, wherein P is contained 0.001% by mass or more and 0.2% by mass or less.

4. A copper alloy plate with a plating film comprising
a copper alloy plate containing more than 1.2% by mass and 2% by mass or less of Mg in a center portion of a plate thickness direction and the balance of Cu and inevitable impurities, and
a plating film formed on a surface layer portion of the copper alloy plate, wherein
a surface Mg concentration at a surface of the copper alloy plate is 30% or less of a center Mg concentration at the center portion of the plate thickness direction, and
the surface layer portion has a concentration gradient where a Mg concentration increases from the surface toward the center portion of the plate thickness direction with 0.2% by mass/μm or more and 50% by mass/μm or less, and has a depth from the surface to where the Mg concentration is 90% of the center Mg concentration.

5. The copper alloy plate with a plating film according to claim 4, wherein an average concentration of Mg in the plating film is 10% or less of the center Mg concentration.

6. The copper alloy plate with a plating film according to claim 4, wherein the plating film is formed from one or more layer selected from tin, copper, zinc, nickel, gold, silver, and palladium and alloys thereof.

7. The copper alloy plate with a plating film according to claim 4, wherein a thickness of the surface layer portion is 9 μm or less.

8. The copper alloy plate with a plating film according to claim 4, wherein the copper alloy plate contains P of 0.001% by mass or more and 0.2% by mass or less.

9. A manufacturing method of a copper alloy plate comprising
an Mg enrichment treatment forming a surface portion in which Mg is concentrated by diffusing and concentrating Mg on a surface of a copper alloy plate, and
a surface portion removal treatment forming a surface layer portion by removing the surface portion, wherein
the copper alloy plate after the Mg enrichment treatment and the surface portion removal treatment contains Mg more than 1.2% by mass and 2% by mass or less and the balance Cu and inevitable impurities at a center portion of a plate thickness direction;
a surface Mg concentration at a surface of the surface layer portion is 30% or less of a center Mg concentration at the center portion of the plate thickness direction; and
in the surface layer portion, the Mg concentration increases from the surface toward the center portion of the plate thickness direction with a concentration gradient of 0.2% by mass/μm or more and 50% by mass/μm or less, and the surface layer portion has a depth from the surface to where a Mg concentration is 90% of the center Mg concentration.

10. The manufacturing method of a copper alloy plate according to claim 9 wherein a thickness of the surface layer portion is 9 μm or less.

11. The manufacturing method of a copper alloy plate according to claim 9, wherein the copper alloy plate containing 0.001% by mass or more and 0.2% by mass or less of P.

12. A method of forming the copper alloy plate with a plating film according to claim 4, wherein
the plating film is formed on the copper alloy plate by an electrolytic plating treatment with a current density of 0.1 A/dm$^2$ or more and 60 A/dm$^2$ or less.

13. The method of forming a copper alloy plate with a plating film according to claim 12, wherein
the plating film contains tin; and
after the electrolytic plating treatment, a reflow treatment is performed at 230° C. or more and 330° C. or less of heating peak temperature, for 0.5 seconds or more and 30 seconds or less of heating time at the heating peak temperature.

* * * * *